(12) United States Patent
Kawabuchi et al.

(10) Patent No.: US 8,117,665 B2
(45) Date of Patent: Feb. 14, 2012

(54) DATA MANAGING METHOD, DATA MANAGING DEVICE AND DATA MANAGING SERVER SUITABLE FOR RESTRICTING DISTRIBUTION OF DATA

(75) Inventors: Yoichi Kawabuchi, Itami (JP); Yoshikazu Ikenoue, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1120 days.

(21) Appl. No.: 11/008,252

(22) Filed: Dec. 10, 2004

(65) Prior Publication Data

US 2006/0059570 A1 Mar. 16, 2006

(30) Foreign Application Priority Data

Sep. 10, 2004 (JP) ................................. 2004-264285

(51) Int. Cl.
*G06F 7/04* (2006.01)
(52) U.S. Cl. ............... 726/28; 726/26; 726/27
(58) Field of Classification Search .................. 713/150, 713/161, 165, 166, 168, 181, 182; 726/4, 726/26–28
See application file for complete search history.

(56) References Cited

U.S. PATENT DOCUMENTS

| | | | |
|---|---|---|---|
| 5,671,277 A | 9/1997 | Ikenoue et al. | |
| 5,867,646 A * | 2/1999 | Benson et al. | ..................... 726/4 |
| 5,956,420 A | 9/1999 | Ikenoue | |
| 5,987,127 A | 11/1999 | Ikenoue et al. | |
| 6,166,750 A | 12/2000 | Negishi | |
| 6,175,714 B1 * | 1/2001 | Crean | ........................... 399/366 |
| 6,339,650 B1 | 1/2002 | Yoshida et al. | |
| 6,340,931 B1 | 1/2002 | Harrison et al. | |
| 6,421,450 B2 * | 7/2002 | Nakano | .......................... 382/100 |
| 6,510,464 B1 * | 1/2003 | Grantges et al. | .............. 709/225 |
| 6,523,113 B1 | 2/2003 | Wehrenberg | |
| 6,647,126 B1 | 11/2003 | Wen | |
| 6,738,491 B1 | 5/2004 | Ikenoue et al. | |
| 2002/0188840 A1 | 12/2002 | Echizen et al. | |
| 2003/0158945 A1 * | 8/2003 | Liu | ............................... 709/227 |

(Continued)

FOREIGN PATENT DOCUMENTS

JP 07-085007 3/1995

(Continued)

OTHER PUBLICATIONS

Japanese Office Action mailed Dec. 15, 2009 in corresponding Japanese Patent Application No. 2004-264285.

*Primary Examiner* — Kim Vu
*Assistant Examiner* — Suman Debnath
(74) *Attorney, Agent, or Firm* — Buchanan Ingersoll & Rooney PC

(57) ABSTRACT

In order to prevent invalid distribution of data, a data managing method includes the steps of inputting a document, extracting, from the input document, a document No. for identifying the document, receiving the input of a user ID for identifying a user, determining whether or not a process for the input document is permitted for the user identified by the acquired user ID by referring to permission data, and forbidding the execution of output processes for the input data in the case where it has been determined in the determining step that the process is not permitted. The permission data is data which associates, for each document No., user IDs with the process names for identifying processes permitted for the document.

12 Claims, 14 Drawing Sheets

U.S. PATENT DOCUMENTS

| | | |
|---|---|---|
| 2003/0225863 A1* | 12/2003 | Kajino et al. ............... 709/219 |
| 2004/0010701 A1* | 1/2004 | Umebayashi et al. ........ 713/193 |
| 2004/0128555 A1 | 7/2004 | Saitoh et al. |

FOREIGN PATENT DOCUMENTS

| | | |
|---|---|---|
| JP | 11-232259 | 8/1999 |
| JP | 11-259459 | 9/1999 |
| JP | 2001-045271 | 2/2001 |
| JP | 2001-218022 | 8/2001 |
| JP | 2001-245145 | 9/2001 |
| JP | 2002-163237 | 7/2002 |
| JP | 2003-036207 | 2/2003 |
| JP | 2003-044297 | 2/2003 |
| JP | 2003-122726 | 4/2003 |
| JP | 2003-331096 | 11/2003 |
| JP | 2003-337687 | 11/2003 |
| JP | 2004-151163 | 5/2004 |
| JP | 2004-171101 | 6/2004 |
| JP | 2004-192610 | 7/2004 |

* cited by examiner

FIG. 4

ORIGINAL DATA LIST

| DOCUMENT NO. | FILE NAME OF DATA |
|---|---|
| 001 | AAA.text |
| 002 | BBB.jpg |
| 003 | CCC.doc |
| ⋮ | ⋮ |
| 100 | DDD.doc |
| ⋮ | ⋮ |

F I G. 5

DOCUMENT MANAGEMENT DATA

| DOCUMENT NO. | PARENT DOCUMENT NO. | BIBLIOGRAPHIC ITEM ||||||| MANAGEMENT STYLE |
| --- | --- | --- | --- | --- | --- | --- | --- | --- | --- |
| | | CATEGORY ||| PERSON WHO CREATED DOCUMENT | DATE ON WHICH DOCUMENT WAS CREATED | DOCUMENT NAME | TOTAL NUMBER OF PAGES | |
| | | REQUIREMENT SPECIFICATION | FUNCTION SPECIFICATION | DESIGN SPECIFICATION | | | | | |
| 001 | — | ○ | — | — | XX1 | 040901 | AAA. txt | 10 | DISTRIBUTION HISTORY MANAGEMENT |
| 100 | — | — | ○ | — | XX2 | 040901 | DDD. doc | 20 | WORK FLOW MANAGEMENT |
| .. | .. | .. | .. | .. | .. | .. | .. | .. | .. |

F I G. 6

DISTRIBUTION HISTORY MANAGEMENT
PERMISSION DATA

DOCUMENT NO. 001

| PROCESS NAME | USER ID |
|---|---|
| SCANNING | XXX, YYY |
| E-MAIL SENDING | XXX, YYY, ZZZ |
| E-MAIL RECEIVING | XXX, YYY |
| PRINTING | XXX, YYY |
| ACCUMULATING | ZZZ |

F I G. 7

WORK FLOW MANAGEMENT PERMISSION DATA

| DOCUMENT NO. | PERSON WHO GIVES APPROVAL | PERSON WHO IS DISTRIBUTION DESTINATION | PERSON WHO IS AUTHORIZED FOR READING | STATE | | |
|---|---|---|---|---|---|---|
| | | | | COMPLETION OF CREATION | COMPLETION OF APPROVAL | COMPLETION OF DISTRIBUTION |
| 100 | X100 | X001, X002, X003 | X010, X020, X030 | ○ | ○ | NOT-YET |
| 200 | NOT-YET | X001, X002 | X011, X020 | ○ | NOT-YET | NOT-YET |
| .. | .. | .. | .. | .. | .. | .. |

FIG. 8

DISTRIBUTION HISTORY DATA

DOCUMENT NO. 001

| PROCESS NAME | USER ID |
|---|---|
| SCANNING | XXX |
| E-MAIL RECEIVING | YYY |
| : | : |

F I G. 1 3

DOCUMENT NO. 500

|  | RANK FIRST | RANK SECOND | RANK THIRD |
|---|---|---|---|
| INPUT PROCESS | ALL | ALL | E-MAIL SENDING, PRINTING |
| OUTPUT PROCESS | ALL | E-MAIL SENDING, PRINTING | ACCUMULATING |
| — | X001 | X010 | X011 |
|  |  |  | X012 |
|  |  | X020 | X021 |
|  |  |  | X022 |
|  |  |  | X023 |

DATA MANAGING METHOD, DATA MANAGING DEVICE AND DATA MANAGING SERVER SUITABLE FOR RESTRICTING DISTRIBUTION OF DATA

This application is based on Japanese Patent Application No. 2004-264285 filed with the Japan Patent Office on Sep. 10, 2004, the entire content of which is hereby incorporated by reference.

BACKGROUND OF THE INVENTION

1. Field of the Invention

The present invention relates to a data managing method, a data managing device and a data managing server. More particularly, the present invention relates to a data managing method, a data managing device and a data managing server suitable for restricting distribution of data.

2. Description of the Related Art

In recent years, progression of image digitization technologies and widespread use of networks have been making it easier to optically read images, convert them into digital electronic data, send or receive them through networks, and then record them in other recording media or print them onto other recording media. Along with this, there is a possibility of occurrence of wrong acts of copying documents which are prohibited from being copied, converting them into electronic data and distributing it.

As a technique for preventing such wrong acts, Japanese Laid-Open Patent Publication No. 2001-218022 discloses a method which acquires digital images with permission information embedded therein, extracts the permission information from the digital images and authenticates the permission to generate visualized images of the digital images through an image processing device from the extracted permission information, and after the authenticating step, generates visualized images from the digital images using the image processing device.

However, this method determines whether or not the generation of images is permitted only from the permission information. Therefore, it is impossible to determine whether or not copying images should be permitted depending on the person who intends to copy the images. Namely, images which are prohibited from being copied can not be copied, without exception, regardless of the person who intends to copy them. Therefore, this method can not be employed in the case where copying is permitted for some persons, but not permitted for the others.

Further, with conventional methods, it is possible to prohibit copying of images uniformly. However, for documents which have to be circulated in a predetermined order such as documents which are circulated in a predetermined order in a corporation, it is impossible to permit a person who is later in the circulating order only after persons who are earlier in the circulating order have read the documents.

SUMMARY OF THE INVENTION

The present invention has been made in order to solve the aforementioned problems. It is an object of the present invention to provide a data managing method, a data managing device and a data managing server capable of preventing invalid data distribution.

It is another object of the present invention to provide a data managing method capable of specifying the order of users who receive data.

In order to attain the aforementioned objects, according to one aspect of the present invention, a data managing method includes the steps of inputting data; extracting, from the input data, data identification information for identifying this data; receiving the input of user identification information for identifying a user; determining whether or not processes for the input data are permitted for the user identified by the acquired user identification information, by referring to permission data; and forbidding the execution of output processes for the input data in the case where it has been determined in the determination step that the processes are not permitted; wherein the permission data is data which associates, for each data identification information, user identification information with process identification information for identifying processes permitted for the data.

According to the present invention, it is determined whether or not process for input data are permitted for the user identified from user identification information, by referring to permission data. If it is determined that they are not permitted, the execution of output processes for the input data is forbidden. Therefore, even if a user who is not permitted to execute a process instructs the execution of the process, the data will not be output. Therefore, it is possible to provide a data managing method capable of preventing invalid data distribution.

According to another aspect of the present invention, a data managing device includes a permission data storage unit for storing permission data which associates, for each data identification information for identifying data, user identification information for identifying users with process identification information for identifying processes permitted for the data; a data inputting portion for inputting data; an identification information extracting portion for extracting, from the input data, data identification information for identifying this data; a user identification information input portion for receiving the input of user identification information for identifying a user; a determination portion for determining whether or not processes for the input data are permitted for the user identified by the acquired user identification information, by referring to permission data; and a forbidding portion for forbidding the execution of output processes for the input data in the case where the determination portion has determined that the processes are not permitted.

According to the present invention, it is possible to provide a data managing device capable of preventing invalid data distribution.

According to a further other aspect of the present invention, a data managing device capable of communicating with a server through a communication line, the server including a permission data storage unit for storing permission data which associates, for each data identification information for identifying data, user identification information for identifying users with process identification information for identifying processes permitted for the data, the data managing device comprising: a data input portion for inputting data; an identification information extracting portion for extracting, from the input data, data identification information for identifying this data; a user identification information input portion for receiving the input of user identification information for identifying a user; a transmitting portion for transmitting the acquired data identification information, the received user identification information, and process identification information for identifying processes for the input data, to the server; and a forbidding portion for forbidding the execution of output processes for the input data in the case where a response signal which is received in response to the transmission performed by the transmitting portion is a signal which does not permit the execution of the input process.

According to the present invention, data identification information, user identification information and process identification information are sent to the server. Whether or not a process for input data is permitted for the user identified by the user identification information is received from the server and if it is not permitted the execution of output processes for the input data is forbidden. Therefore, even if a user who is not permitted to execute a process instructs the execution of the process, the data will not be output. Therefore, it is possible to provide a data managing device capable of preventing invalid data distribution.

According to a further other aspect of the present invention, a data managing server comprising: a permission content storage unit for storing permission data which associates, for each data identification information for identifying data, user identification information for identifying users with process identification information for identifying processes permitted for this data; a receiving portion for receiving data identification information, user identification information and a process execution instruction; a determination portion for determining whether or not the execution of a process according to the received process execution instruction for the received data identification information is permitted for the user identified by the acquired user identification information; and a transmitting portion for sending the result of determination performed by the determination portion.

According to the present invention, when data identification information, user identification information and a process execution instruction are received, it is determined whether or not the execution of a process according to the received process execution instruction for the received data identification information is permitted for the user identified by the acquired user identification information. Then, the result of the determination is transmitted. Therefore, it is possible to provide a data managing server capable of preventing invalid data distribution.

According to another aspect of the present invention, a data managing device is capable of communicating with a server through a communication line, the server including a permission data storage unit for storing permission data which associates, for each data identification information for identifying data, user identification information for identifying users with process identification information for identifying processes permitted for this data. The data managing device includes a data input portion for inputting data; an identification information extracting portion for extracting, from the input data, data identification information for identifying this data; a transmitting portion for sending the acquired data identification information to the server; a receiving portion for receiving permission contents corresponding to the data identification information in response to the transmission of the data identification information performed by the transmitting portion; a determination portion for determining whether or not the execution of a process for the input data is permitted, by referring to the received permission contents; and a forbidding portion for forbidding the execution of output processes for the input data in the case where the determination portion has determined that the execution is not permitted.

According to the present invention, data identification information is transmitted to a server and permission data is received. Then, it is determined whether or not a process for input data is permitted for the user identified by user identification information, by referring to permission data. If it is determined that the process is not permitted, the execution of output processes for the input data is forbidden. Therefore, even if a user who is not permitted to execute a process instructs the execution of the process, the data will not be output. Therefore, it is possible to provide a data managing device capable of preventing invalid data distribution.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view illustrating an example of the original data list stored in a server;

FIG. 5 is a view illustrating an example of the document management data;

FIG. 6 is a view illustrating an example of the distribution history management permission data;

FIG. 7 is a view illustrating an example of the work flow management permission data;

FIG. 8 is a view illustrating an example of the distribution history data;

FIG. 13 is a view illustrating an example of permission data stored in the server of a data management system according to a second embodiment.

DESCRIPTION OF THE PREFERRED EMBODIMENTS

Figure 1:
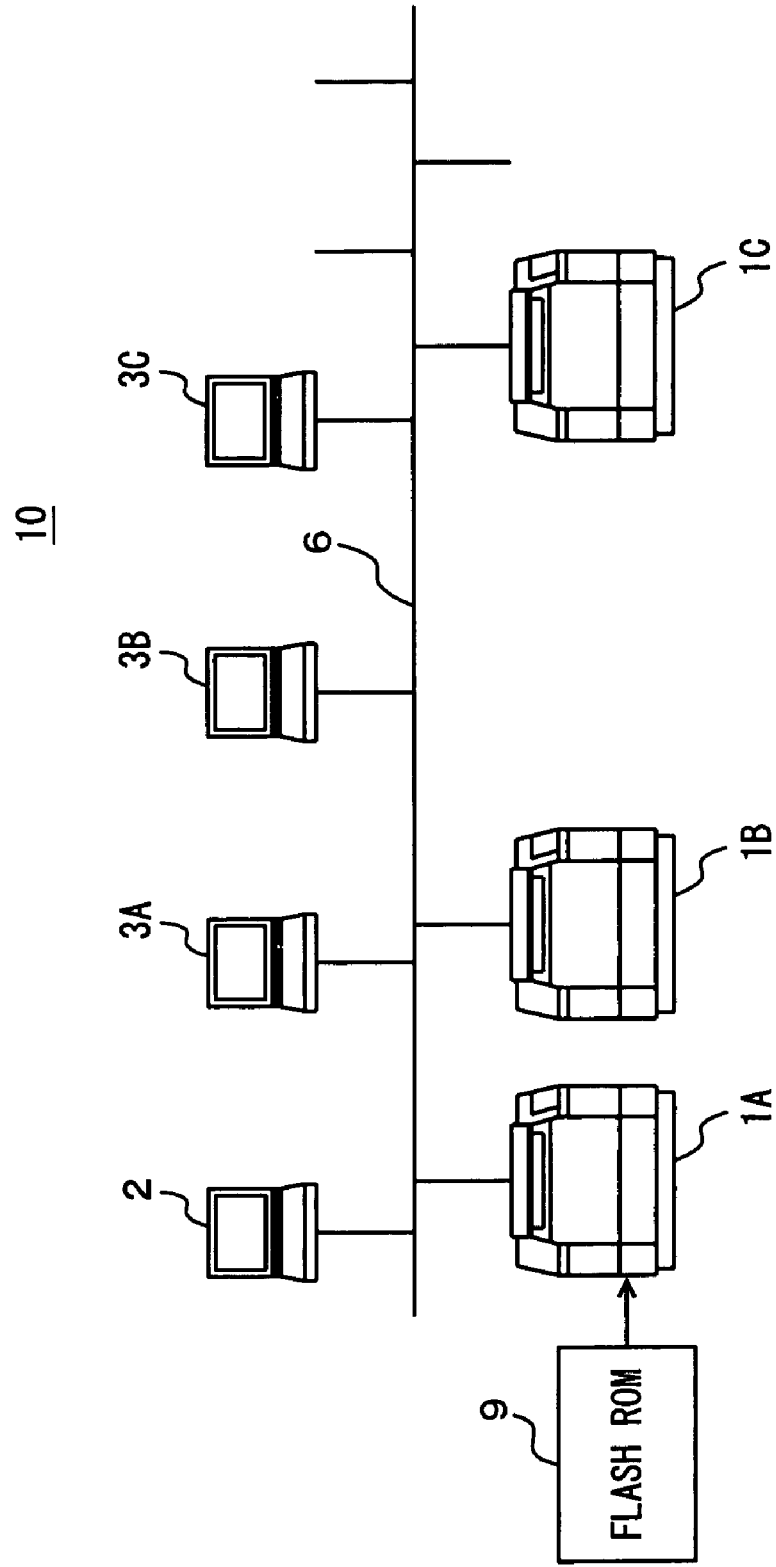
FIG. 1 is a view illustrating the entire structure of a data management system according to a first embodiment of the present invention.

Hereinafter, embodiments of the present invention will be described with reference to the drawings. In the following description, the same or similar components are designated by like reference characters. The designations and the functions are also identical. Therefore, detail description thereof will not be repeated.

First Embodiment

FIG. 1 is a view illustrating the general outline of a data management system according to one of the embodiments of the present invention. Referring to FIG. 1, the data management system 10 includes multi function peripherals (hereinafter, referred to as "MFPs") 1A, 1B and 1C, a server 2, and user computers 3A, 3B and 3C, which are connected to a network 6.

Server 2 is comprised of a common computer and stores original documents, document management data for managing the distribution of documents, permission data, document distribution history data, in the data management system.

MFPs (multi function peripherals) 1A, 1B and 1C include a scanner for reading manuscripts, a network controller for communicating with other machines connected to the network, an image generating machine for generating images on recording media, such as papers, based on image data, a facsimile and a hard disc and have an image reading function, an E-mail sending/receiving function, a file transfer function, a copy function, a facsimile sending/receiving function, a printing function for printing data, and a file accumulating function. MFPs 1A, 1B and 1C have the same functions and therefore MFP 1A will be described as an example unless otherwise mentioned.

The number of server 2, MFPs 1A, 1B and 1C, PCs 3A to 2E is not limited to that illustrated in FIG. 1.

A detachable flash ROM 9 is mounted to MFP 1A. Programs stored in this flash ROM 9 are executed by the central processing unit (CPU) included in MFP 1A. Instead of reading programs out of flash ROM 9, programs may be stored in EEPROM (Electrically Erasable/Programmable Read Only Memory). MFP 1A executes programs stored in the EEPROM with the CPU. The content stored in the EEPROM can be rewritten or an additional content can be written thereto. Therefore, other computers connected to network 6 can rewrite programs stored in the EEPROM of MFP 1A or additionally write a new program therein. Further, MFP 1A can download programs from user computers 3A to 3C connected to network 6 and store the programs in the EEPROM.

Network 6 is a local area network (LAN). The network may be the internet or the public switched telephone network and may be either wired or wireless.

While there will be described an example that programs which are executed by MFP 1A are stored in flash ROM 9 and distributed, there may be employed other recording media such as flexible discs, cassette tapes, CD-ROMs, hard discs, optical discs (MO (Magnetic Optical Discs)/MD (Mini Discs)/DVD (Digital Versatile Discs)), IC cards (including memory cards), optical cards or semiconductor memories such as mask ROMs, EPROMs, EEPROMs which fixedly carry programs. Also, programs may be downloaded from other devices through network 6.

The programs described herein include source-program-formed programs, compression-processed programs, coded programs, etc., as well as programs which can be executed directly by the CPU.

Figure 2:
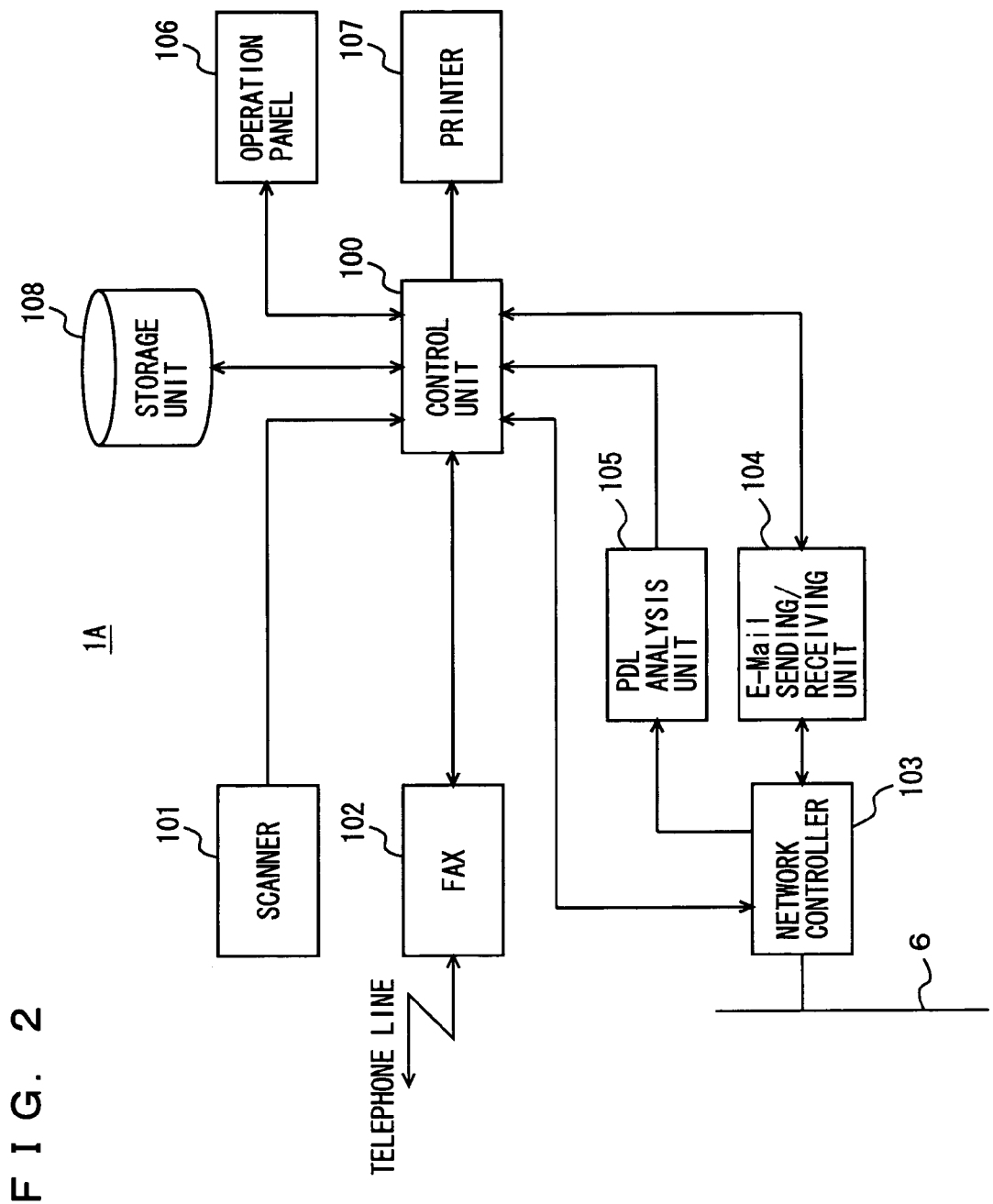
FIG. 2 is a functional block diagram illustrating the general structure of a MFP according to the present embodiment.

FIG. 2 is a functional block diagram illustrating the general structure of the MFPs according to the present embodiment. Referring to FIG. 2, MFP 1A includes a control unit 100 for controlling the entire MFP 1A, a scanner 101 for optically reading manuscripts and outputting image data, a storage unit 108 which is a storing device such as a hard disc, an operation panel 106 which receives user's operation, a network controller 103 for connecting control unit 100 to network 6, an E-mail sending/receiving unit 104, a printer description language (PDL) analysis unit 105, and a printer 107 for generating image on recording media such as a paper.

Scanner 101 includes a photoelectric conversion device such as a CCD (Charge Coupled Device) and optically reads manuscripts and outputs image data as electronic data. Image data output from scanner 101 is output to storage unit 108. At this time, when a user ID and a password are input, the image data is stored in a box provided in storage unit 108 in correspondence with the user ID.

FAX 102 is a facsimile machine and is connected to a public switched telephone network such as a telephone line. Data received by FAX 102 is stored in storage unit 108 or output from printer 107.

Network controller 103 is connected to network 6 and is a communication interface for connecting MFP 1A to network 6. Network controller 103 is connected to control unit 100, PDL analysis unit 105 and E-mail sending/receiving unit 104. Network controller 103 sends data input from control unit 100 to network 6 and outputs data received from network 6 to the control unit. Network controller 103 outputs print data received through network 6 to PDL analysis unit 105. Further, network controller 103 outputs E-mails received through network 6 to E-mail sending/receiving unit 104 and sends E-mails input from E-mail sending/receiving unit 104 to network 6.

Operation panel 106 includes an input portion for receiving input generated by user's operation and a display portion for displaying predetermined information.

Storage unit 108 is a storing device such as a hard disc. As storage unit 108, a semiconductor memory such as a random access memory (RAM), etc., may be employed. Storage unit 108 stores data input to MFP 1A, such as image data read by the scanner, data received by network controller 103, print data analyzed by PDL analysis unit 105, data received by E-mail sending/receiving unit 104, etc. Further, storage unit 108 has a particular storing region. This particular storing region is a region for storing data, of data input to MFP 1A, which has been determined to be invalid by processes which will be described later.

Printer 107 visualizes, on recording media such as a paper, image data read by scanner 101, data received from other computers through network computer 103, and data stored in storage unit 108.

Figure 3:
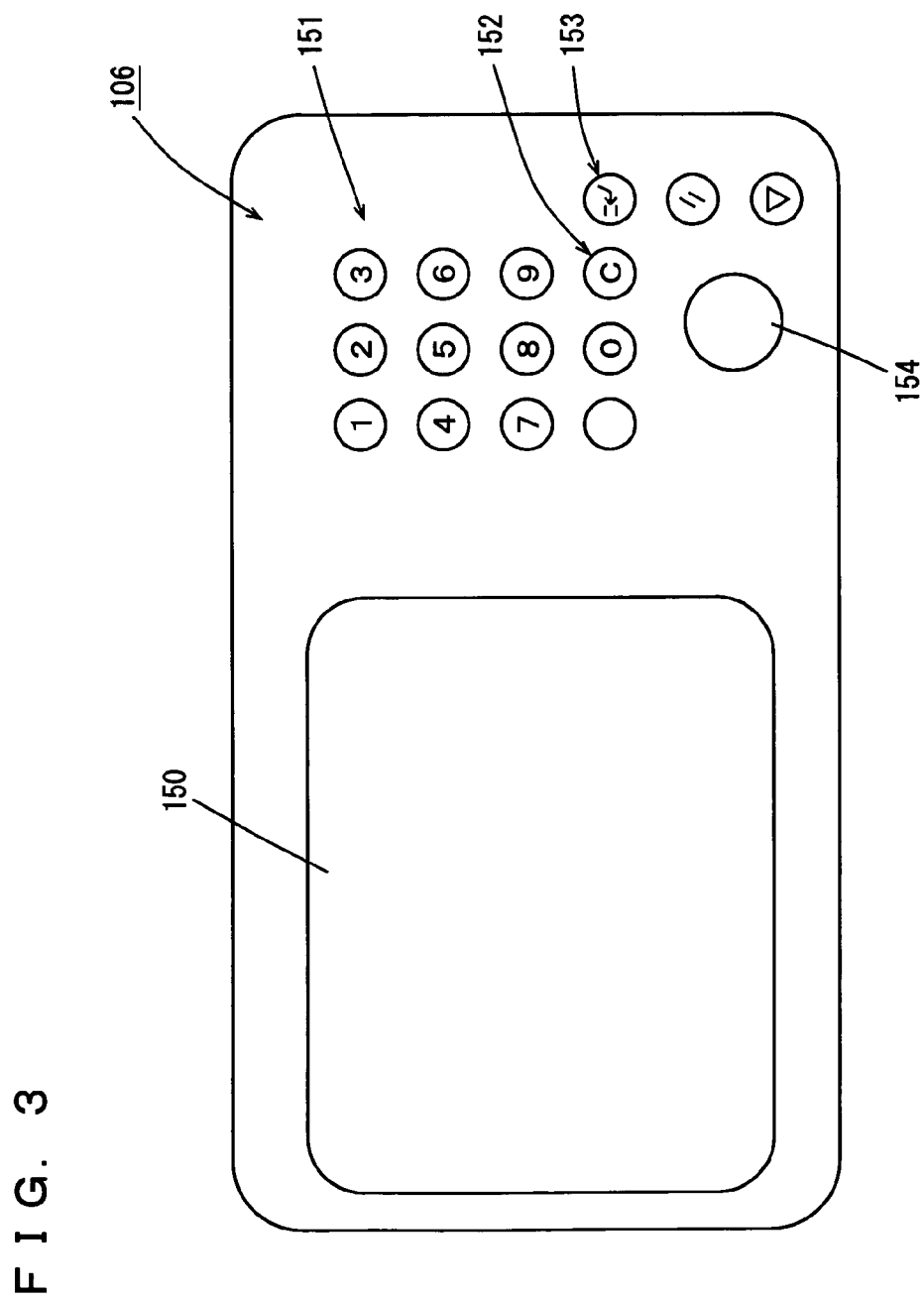
FIG. 3 is a plan view of an operation panel 106.

FIG. 3 is a plan view of operation panel 106. Referring to FIG. 3, operation panel 106 is provided with a liquid crystal touch panel 150, ten keys 151, a clear key 152 for returning a set value to an initial value, an interrupt key 153 for performing interrupt copying, and a start button 154 for commanding the start of image reading. Liquid crystal touch panel 150 is formed from a liquid crystal display device and a touch panel formed from a transparent member and stacked on the liquid crystal display device. The liquid crystal display panel corresponds to the display portion. The touch panel, ten keys 151, clear key 152, interrupt key 153 and start button 154 correspond to the input portion. By displaying instruction buttons on the liquid crystal display device and detecting the instruction of the buttons on the touch panel, various operations are made possible. The operation panel 106 displays, on MFP 1A, a log-in image plane for receiving log-in operation performed by the user to receive input of a user ID and a password.

Data management system 10 according to the present embodiment prevents invalid distribution of data. Thus, data management system 10 permits a predetermined user to execute a predetermined process for each data. Processes which are not permitted will not be executed and therefore the inputting or outputting of data will not be performed. Therefore, data management system 10 according to the present embodiment restricts processes which are executed for data to be managed, in order to restrict the execution of processes which are not permitted.

Data to be managed is electronic data such as image data read by scanner 101, facsimile data sent or received by FAX

102, data generated using application programs of computers, etc, image data taken by digital cameras, etc. Further, data to be managed includes image data generated on recording media such as a paper.

The processes restricted for data to be managed are identified by the document No. for specifying the data (data identification information), the user ID (user identification information) and the process to be executed (process identification information).

The document No. is unique information given in advance to the data for identifying the data.

A user ID is unique information given in advance to each user for identifying the user. User IDs are prestored in storage unit 108 of MFP 1A together with passwords. The user IDs are used in the data management system.

The processes are processes which are applied to the data and process identification information is given to each process in order to identify the processes. The process identification information is unique information given to each process for identifying the processes. Here, the process identification information is designated by the name of process. The processes are broadly divided into input processes and output processes. The input processes include an E-mail receiving process for receiving data through E-mails, a facsimile receiving process for receiving facsimile data by the facsimile, a file receiving process for receiving data through file transfer, a scanning process for inputting data by reading images through the scanner, a print data receiving process for receiving print data from exterior devices, a reading process for reading data from recording media such as storage unit 108. The output processes include an E-mail sending process for sending data through E-mails, a file sending process for sending data through file transfer, a facsimile sending process for sending facsimile data through the facsimile, an accumulating process for storing data in recording media such as storage unit 108, and a printing process for generating images on recording media such as a paper through printer 107.

In order to restrict processes which are executed for data to be managed, data management system 10 according to the present embodiment stores, in server 2, original data, document management data, distribution management permission data, work flow management permission data.

FIG. 4 is a view illustrating an example of an original data list stored in the server. Original data is stored in the recording media such as a hard disc, etc., of server 2 in the case where the user who generated the data requires that the distribution of the data is managed by the data management system. In this case, a document No. is given to the original data, and the document No. is associated with the file name of the original data by the original data list. As illustrated in FIG. 4, document Nos. and file names of data are associated and stored.

FIG. 5 is a view illustrating an example of the document management data. Referring to FIG. 5, the document management data defines a parent document No., data bibliographic items and a management style for each document No. In the case where the data is copied, the parent document No. associates the copied subsidiary document with the original parent document. As the bibliographic items and the management style of the document management data of the subsidiary document, the bibliographic items and the management style of the parent document are used as they are. The bibliographic items includes a data category, the person who created the document, the date on which the document was created, the title of the document and the total number of pages. The category specifies the type of document and categorizes documents as requirement specifications, function specifications and design specifications.

The management style refers to the style of data distribution management and includes distribution history management and work flow management herein. The distribution history management restricts, for each user, the processes which are permitted to be executed. The work flow management permits a predetermined user to execute a predetermined process after a particular user performs a particular action. For example, after a specification is created, only when a chief has given approval, which is a particular action, a particular user in a different department can read the specification. As the management style, the distribution history management and the work flow management can be performed concurrently.

FIG. 6 is a view illustrating an example of distribution history management permission data stored in the server. Referring to FIG. 6, the distribution history management permission data is data which associates the names of processes with user IDs for each document No. In FIG. 6, for the data having a document No. of "001", "the scanning process" is permitted for two users "XXX" and "YYY", "the E-mail sending process" is permitted for three users "XXX", "YYY" and "ZZZ". Further, "the E-mail receiving process" is permitted for the two users "XXX" and "YYY", and "the printing process" is permitted for the two users "XXX" and "YYY". "The accumulating process" is permitted for only the user "ZZZ".

FIG. 7 is a view illustrating exemplary work flow management permission data. The work flow management permission data associates each document No. with the user ID of the person who gives approval, the user ID of the person who is the distribution destination, the user ID of the person who is authorized for reading, and the state. The state indicates the current data state in the work flow. The management states of the work flow includes three states: the completion of creation, approval and distribution. When each state ends, the next state is entered. For example, when data having a document No. "100" has been created and then registered to the original data list as original data, the state of the completion of creation is entered. Then, when the person who gives approval has given approval, the state of the completion of approval is entered. When the person who is the distribution destination has received the data, the state of the completion of distribution is entered.

In the work flow management permission data, the processes permitted for the person who is the distribution destination and the processes permitted for the person authorized for reading are different in the respective states. In the state of the completion of creation, no process is permitted for the person who is the distribution destination, but the input processes are permitted for the person authorized for reading. In the state of the completion of approval where the person who gives approval has given approval, all the input processes and the output processes are permitted for the person who is the distribution destination and the person authorized for reading. When all the persons who are the distribution destinations have completed the input processes, the state of the completion of distribution is entered. Whether or not all the persons who are the distribution destinations have completed the input processes is determined based on the distribution history data which will be described later.

FIG. 8 is a view illustrating exemplary distribution history data. The distribution history data is data which associates, for each document No., the names of processes which have been executed with the user IDs of the users who executed the processes.

Figure 9:
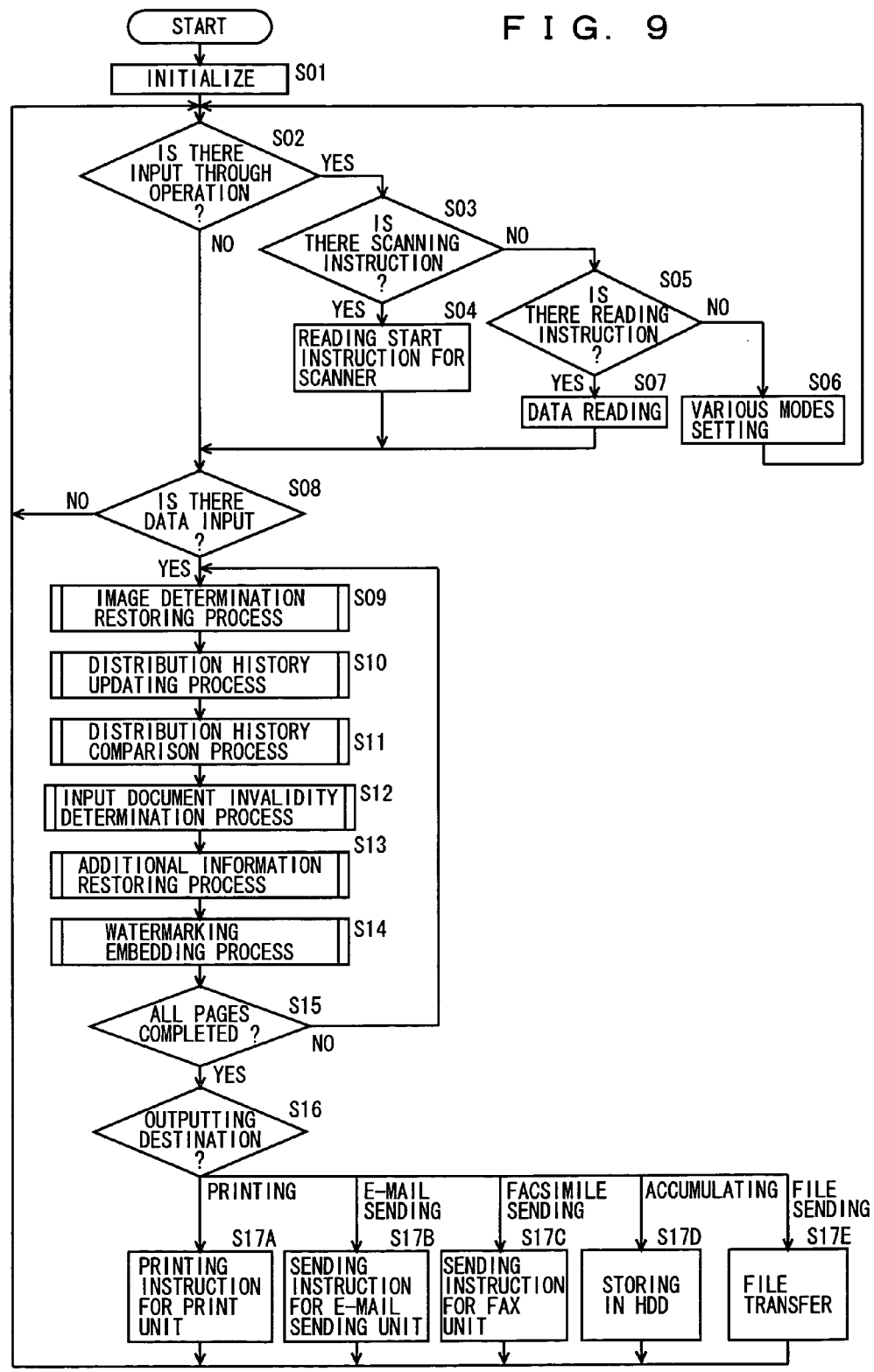
FIG. 9 is a flow chart illustrating the flow of processes which are executed in the MFP according to the present embodiment.

FIG. 9 is a flow chart illustrating the flow of processes which are executed by the MFPs according to the present embodiment. Referring to FIG. 9, MFP 1A initializes variable data etc (step S01). This initializing process includes a logging-in process of a user. The user who operates MFP 1A has to execute the logging-in process before operating MFP 1A. In the logging-in process, a log-in image plane is displayed on liquid crystal touch panel 150 of operation panel 106 and the user inputs a user ID and a password according to the log-in image plane by using ten keys 151, etc. Thus, user authentication is performed and only authorized users are allowed to operate MFP 1A. By this logging-in process, MFP 1A can grasp the user ID of the person who performs operation.

Then, it is determined whether or not input through operation has been performed (step S02). The input through operation refers to user's operation using the operation panel. Here, when an instruction such as pushing of any buttons has been input, it is determined that input through operation has been performed. When input through operation has been performed, the process proceeds to step S03. When no input through operation has been performed, the process proceeds to step S07.

In step S03, it is determined whether or not the operation input in step S02 is the instruction for scanning. If it is the instruction for scanning, the operation input in step S02 corresponds to the user's instruction for executing the input process. Here, the operation is determined to be the instruction for scanning in the case where the scanning process is set as the input process which will be described later and also it is detected that start button 154 has been pushed. If it is the instruction for scanning, the process proceeds to step S04. If not, the process proceeds to step S08.

In step S04, an instruction for reading is output to scanner 101 and the reading of a manuscript is performed. This corresponds to the execution of the input process by the user for the image data created on the manuscript. After step S04, the process proceeds to step S08.

In step S05, it is determined whether or not the operation input in step S02 is the instruction for reading. If it is the instruction for reading, the operation input in step S02 corresponds to the user's instruction for executing the input process. Here, the operation is determined to be the instruction for reading in the case where the reading process is set as the input process which will be described later and also it is detected that start button 154 has been pushed. If it is the instruction for reading, the process proceeds to step S07. If not, the process proceeds to step S06. Further, the instruction for reading is valid in the case where the file name, etc., for specifying the data to be read is specified.

In step S07, the specified data is read out of storage unit 108. This corresponds to the execution of the input process by the user for the data stored in storage unit 108. After step S07, the process proceeds to step S08.

In step S06, the setting of an operation mode according to the operation input in step S02 is performed. Here, the setting of input process and the setting of output process are included. As the setting of the input process, the scanning process using scanner 101 as the input source or the reading process using storage unit 108 as the input source is set. As the setting of output process, any one of the following processes is set: the printing process using printer 107 as the output destination, the E-mail sending process using E-mail sending/receiving unit 104 as the output destination, the accumulating process using storage unit 108 as the output destination, and the file transfer process using the network controller as the output destination. The input process and the output process can be set by the setting of default as the initial condition. Here, by the setting of default, the scanning process using scanner 101 as the input source is set as the input process and the printing process using printer 107 as the output destination is set as the output process. After step S06, the process returns to step S02.

On the other hand, if there is no input through operation in step S02, the process proceeds to step S08. In step S08, it is determined whether or not the input of data has been performed. If the input of data has been performed, the process proceeds to step S09. If not, the process returns to step S02. In the case where data has been input by the scanning process in step S04 or the reading process in step S07, it is determined that the input of data has been performed. Further, MFP 1A executes the file receiving process for receiving files from external devices through file transfer at network controller 103, the E-mail receiving process for receiving E-mails from external devices at E-mail sending/receiving unit 104, and the print data receiving process for receiving print data from external devices at PDL analysis unit 105. When a file is received at network controller 103, when an E-mail is received at E-mail sending/receiving unit 104, and when print data is received at PDL analysis unit 105, an interrupt occurs and the processes from step S08 will be executed.

Through the reception of a file from at network controller 103, the reception of an E-mail at E-mail sending/receiving unit 104, and the reception of print data at PDL analysis unit 105, if the computer which transmitted the data is identified, the user ID is identified from the computer and the user ID is identified from information included in the received data. The file receiving process at network controller 103, the E-mail receiving process at E-mail sending/receiving unit 104, and the print data receiving process at PDL analysis unit 105 correspond to the execution of the input process by the user for the received data.

MFP 1A according to the present embodiment sets the output process of default for the data input through the file receiving process at network controller 103, the E-mail receiving process at E-mail sending/receiving unit 104, and the print data receiving process at PDL analysis unit 105. The accumulating process for storing data in storage unit 108 is set for the file receiving process by the network controller 103 and the E-mail receiving process by E-mail sending/receiving unit 104. The printing process for printing through printer 107 is set for the print data receiving process by PDL analysis unit 105. If the output process for data is otherwise specified, for example, if a control code, etc., for specifying the output process is received together with the data, the output process according to the control code is set.

In step S09, an image determination restoring process is performed. With the data management system according to the present embodiment, data includes additional information relating to the data, which is embedded therein as watermarking information. The image determination restoring process divides data into the data itself and the additional information. The additional information includes a document No. for specifying the data. By extracting the document No. from the additional information separated from the data, the document No. of the input data can be identified.

Further, the additional information includes the distribution history data of the data. The distribution history data includes user IDs and the process names (process identification information). By extracting the distribution history data from the additional information separated from the data, it is possible to grasp processes which have been executed for the data and users who executed the processes.

In step S10, a distribution history updating process is executed. The document No. is acquired in step S09 for the input document determined in step S08. The input process and the output process set for the MFP 1A are the input process which has been executed for the document and the output process which will be executed for the document. By adding the input process and the output process to the history data extracted from the additional information, the distribution history data is updated. The updated distribution history data is transmitted to server 2.

In step S11, a distribution history comparison process is executed. The distribution history comparison process receives, from server 2, the distribution history management permission data or the work flow management permission data corresponding to the document No. and determines whether or not the input processes and the output processes which have been executed or will be executed by the users of the user IDs included in the distribution history data updated in step S10 are permitted. Namely, it is determined whether or not the input processes which have been executed for inputting the data and the output processes which will be executed are permitted for the users who instructed them. Further, the distribution history data includes data which associates user IDs for identifying the persons who have executed processes with the input processes or the output processes. Therefore, it is determined whether or not the processes which have been executed are permitted.

In step S12, an input document invalidity determination process is executed. In the case where it is determined, by the distribution history comparison process in step S11, that the processes which have been executed and the output processes which will be executed are not permitted, the execution of the output processes which is planed to be executed for the data is forbidden. Further, an E-mail for informing the administrator that invalid processes have been executed is sent to the administrator. The E-mail address of the administrator is prestored in MFP 1A and the E-mail is sent to this E-mail address. The E-mail address may be the E-mail address of the person who created the data, not of the administrator. Also, a file may be transferred to a predetermined computer. When it is determined, by the distribution history comparison process in step S111, that all the processes which have been executed and the output processes which are planed to be executed are permitted, the process proceeds to step S13. If not, the process ends.

In step S13, additional information including the document No. is embedded in the document as watermarking information. Also, the distribution history data updated in step S10 may be included in the additional information.

Next, in step S15, it is determined whether or not the processes of steps S09 to S14 have been executed for all the pages of the document. If so, the process proceeds to step S16. If not, the process returns to step S09.

In step S16, the process is branched according to the setting of the output process. In the case of the printing process, the process proceeds to step S17A. In the case of the E-mail sending process, the process proceeds to step S17B. In the case of the facsimile sending process, the process proceeds to step S17C. In the case of the accumulating process, the process proceeds to step S17D. In the case of the file sending process, the process proceeds to step S17E.

In step S17A, an image is generated on recording media such as a paper by printer 107. In step S17B, the document is sent through an E-mail at E-mail sending/receiving unit 104. In step S17C, the document is converted into facsimile data and sent by FAX 102. In step S17D, the document is stored in storage unit 108. In step S17E, the data is sent through file transfer by network controller 103.

Figure 10:
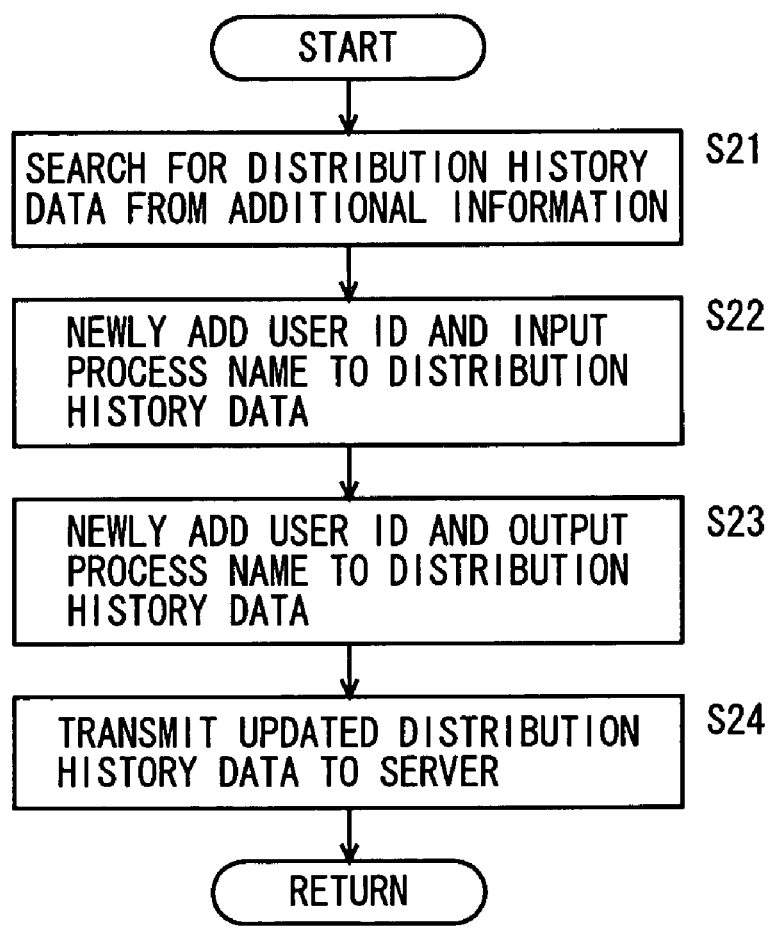
FIG. 10 is a flow chart illustrating the flow of the distribution history updating process which is executed at a step S10 of FIG. 9.

FIG. 10 is a flow chart illustrating the flow of the distribution history updating process which is executed in step S10 of FIG. 9. Referring to FIG. 10, first, in step S21, the distribution history data is extracted from the additional information separated from the document. The distribution history data which associates user IDs with the names of the input processes which have been executed is newly added to the distribution history data extracted in step S21 (step S22). The distribution history data which associates user IDs with the names of the output processes which are planed to be executed is newly added to the distribution history data (step S23).

The distribution history data updated in step S22 and step S23 is sent to server 2 together with the document No. (step S24). The server stores the received distribution history data for each document No.

Figure 11:
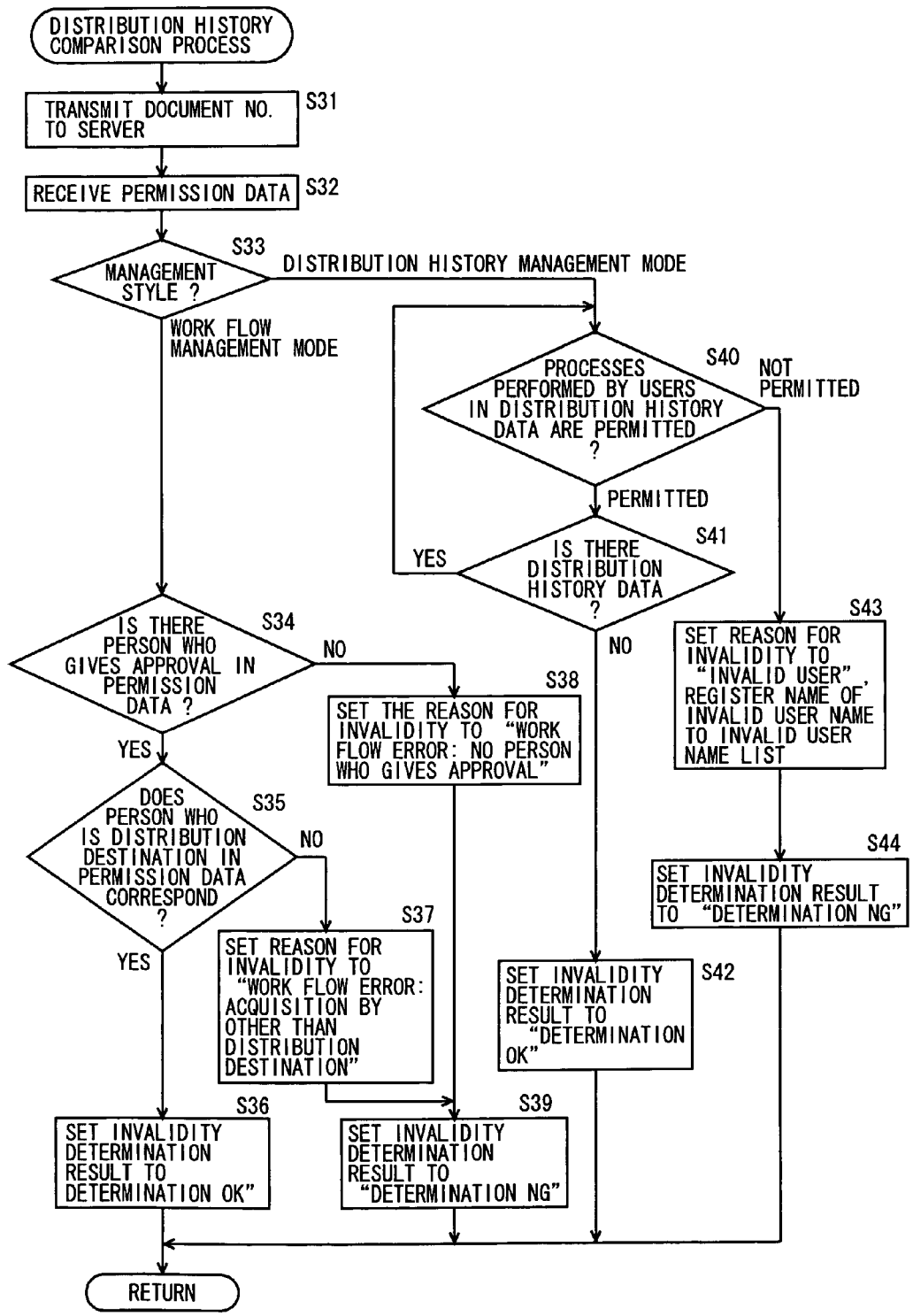
FIG. 11 is a flow chart illustrating the flow of the distribution history comparison process which is executed at a step S11 of FIG. 10.

FIG. 11 is a flow chart illustrating the flow of the distribution history comparison process which is executed in step S11 of FIG. 10. Referring to FIG. 11, the document No. is sent to server 2 (step S31). Server 2 which received the document No. searches the document management data (see FIG. 5) using the document No. as the key to extract the management style. Then, in the case where the management style of the received document No. is the distribution history management, server 2 sends the distribution history management permission data (see FIG. 6) prestored for the document No. to MFP 1A. In the case where the management style of the received document No. is the work flow management, server 2 sends the work flow management permission data (see FIG. 7) prestored for the document No. to MFP 1A.

In step S32, the distribution history management permission data or the work flow management permission data corresponding to the document No., which is sent in step S31, is received from server 2.

In step S33, it is determined whether the management style is the work flow management or the distribution history management. In the case of the work flow management, the process proceeds to step S34. In the case of the distribution history management, the process proceeds to step S40. The management style is determined by determining whether the received permission data is the distribution history management permission data or the work flow management permission data. Also, the management style may be received from server 2.

In step S34, it is determined whether or not the user ID of the person who gives approval is included in the work flow management permission data. As previously described, in the work flow management, the processes permitted for users vary depending on the presence or absence of the approval of the person who gives approval. Here, the presence or absence of the approval of the person who gives approval is determined from the presence or absence of the user ID of the person who gives approval. If there is approval, the process proceeds to step S35. If there is no approval, the process proceeds to step S38.

In step S35, it is determined whether or not the group of user IDs set as the distribution destinations and the processes permitted for the distribution destinations in the work flow management permission data correspond to the group of user IDs and processes in the distribution history data. Referring to FIG. 7, in the work flow management permission data, "X001", "X002" and "X003" are defined as the user IDs of the persons who are the distribution destinations for the document No. "100". With the work flow management permission data, in the case where the person who gives approval has given approval, all the input processes and the output processes are permitted for the persons who are the distribution destinations. Therefore, the group of user IDs set as the persons who are the distribution destinations and processes permitted for the persons who are the distribution destinations in the work flow management permission data refers to the group of the user ID "X001" and all the names of processes, the group of the user ID "X002" and all the names of processes, and the group of the user ID "X003" and all the names of processes. In the case where the groups of user IDs and processes in the distribution history data are not included in the groups of user IDs set as the person who are the distribution destinations and processes permitted for the persons who are the distribution destinations in the work flow management permission data, it is determined that these groups don't correspond. If they correspond, the process proceeds to step S36. If not, the process proceeds to step S37.

Since all the distribution history data is compared, it is determined whether or not the processes executed for the document which is currently processed in MFP 1A are invalid. Therefore, it is possible to prevent documents which have been falsely subjected to processes for some reason from being subjected to more processes.

In step S36, the result of the invalidity determination is set to "determination OK" and the process ends. In step S37, the reason for invalidity is set to "work flow error: acquisition by other than distribution destination". Then, the process proceeds to step S39. In step S39, the result of the invalidity determination is set to "determination NG" and the process ends.

On the other hand, if it is determined in step S34 that the user ID of the person who gives approval is not included in the work flow management permission data, the reason for invalidity is set to "work flow error: no person who gives approval" in step S37. Then, the process proceeds to step S39. In step S39, the result of the invalidity determination is set to "determination NG" and the process ends.

When it is determined in step S33 that the management style is the distribution history management, it is determined in step S40 whether or not the processes executed by the users in the distribution history data are permitted. More specifically, it is determined whether or not the groups of user IDs and process names in the distribution history data are included in the distribution management permission data. If the groups are included, it is determined that they are permitted and the process proceeds to step S41. If the groups are not included, it is determined that they are not permitted and the process proceeds to step S43. In step S41, it is determined whether or not there is distribution history data to be subsequently subjected to the determination process. If there is, the process returns to step S40. If not, the process proceeds to step S42. In step S42, the result of the invalidity determination is set to "determination OK" and the process ends.

Since all the distribution history data is compared, it is determined whether or not the processes executed for the document which is currently processed in MFP 1A are invalid. Therefore, it is possible to prevent documents which have been falsely subjected to processes for some reason from being subjected to more processes.

On the other hand, if it is determined in step S40 that the processes are not permitted, the reason for invalidity is set to "invalid user" and the user ID is sent to server 2 in step S43. Server 2 prestores an invalid user list and resisters the received user ID of the invalid user to the invalid user list. Then, in step S44, the result of the invalidity determination is set to "determination NG" and the process ends.

Figure 12:
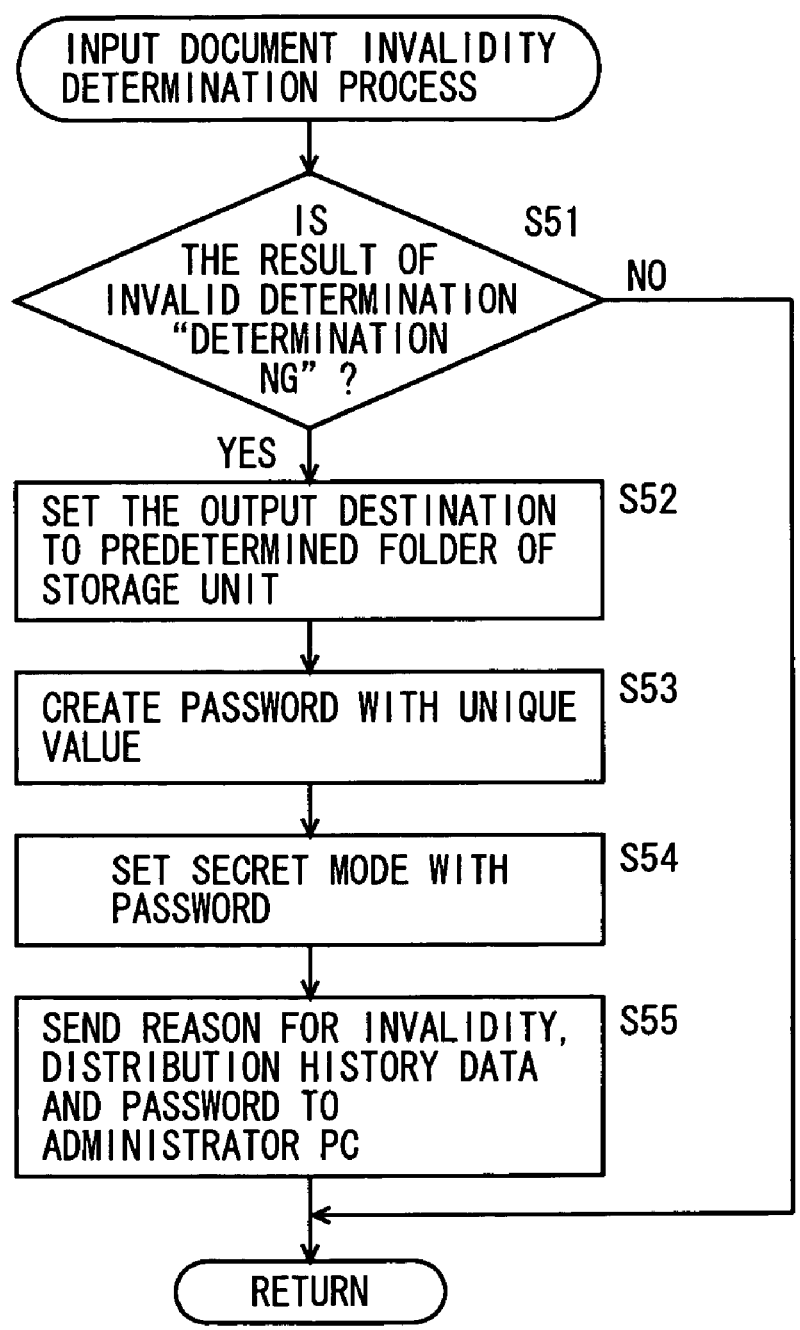
FIG. 12 is a flow chart illustrating the flow of the invalid document invalidity determination process which is executed at a step S12 of FIG. 9.

FIG. 12 is a flow chart illustrating the flow of the invalid document invalidity determination process which is executed in step S12 of FIG. 9. Referring to FIG. 12, the result of the distribution history comparison process is determined (step S51). In the case where the result of the determination is "determination NG", the process proceeds to step S52. In the case where it is "determination OK", the process ends.

In step S52, the output process is changed to the accumulating process which uses a predetermined folder of storage unit 108 as the storing destination. Thus, the output process which has been set is forbidden and documents will be stored in the predetermined folder of storage unit 108.

Then, a password having a unique value is created (step S53) and a secret mode with the created password is set (step S54). Thus, in the event that an invalid process is executed or is intended to be executed for data, the output process for the data is forbidden and the data is stored in the predetermined folder of storage unit 108 in the secret mode with a password.

In step S55, the reason for invalidity set by the distribution history comparison process, the distribution history data and the password created in step S53 are sent to the personal computer (PC) of the administrator. Therefore, only the administrator who knows the password can access the data stored in the predetermined folder.

Second Embodiment

Then, a data management system according to the second embodiment will be described. In the data management system according to the second embodiment, the distribution management permission data and the work flow management permission data stored in the data management system according to the first embodiment are replaced with permission data illustrated in FIG. 13. Further, server 2 is not required to store document management data and is required to store only the permission data illustrated in FIG. 13.

Similarly to the data management system of the first embodiment, additional information is embedded in documents as watermarking information. The additional information includes the document No. and the distribution history data.

The data management system according to the second embodiment differs from the data management system according to the first embodiment in the distribution history comparison process which is executed in MFP 1A.

FIG. 13 is a view illustrating an example of the permission data stored in the server of the data management system according to the second embodiment. The permission data defines, for each document No., the ranks of the users permitted to execute the processes and the names of processes (particular process identification information) permitted for each rank. More specifically, referring to FIG. 13, for the user of a first rank, all input processes and output processes are permitted. For the user of a second rank, all input processes are permitted and the E-mail sending process and the printing process are permitted as the output process. For the user of a third rank, the E-mail sending process and the printing process are permitted as the input process and no output process is permitted. While the particular process identification information is defined herein, when all input processes and all output processes are permitted for the users of all the ranks the permission data is not required to include it. This may reduce the amount of data of the permission data.

Further, "X001" is defined as the user ID of the first rank, which is first permitted to execute the process. "X010" and "X0202" are defined as the user ID of the second rank, which is second permitted to execute the process. "X011" and "X012" are defined as the user ID of the third rank lower than the user ID "X010" of the second rank. "X021", "X022" and "X023" are defined as the user ID of the third rank lower than the user ID "X020" of the second rank.

The user ID "X011" of the third rank is lower than the user ID "X010" of the second rank, but not lower than the user ID "X020" of the second rank.

This permission data permits the execution of the processes permitted for the rank on condition that the groups of all the user IDs at higher ranks and the process names of the output process are included in the distribution history data. Therefore, in the case where any one of the output processes of the user IDs at higher ranks is not included in the distribution history data, the execution of the processes is not permitted.

The data management system according to the second embodiment determines that the input process for inputting data to MFP 1A and the output process which is intended to be executed for outputting the data are not invalid processes, from the permission data illustrated in FIG. 13 and the distribution history data. More specifically, it determines whether or not the groups of all the user IDs at higher ranks and the process names of the output process are included in the distribution history data. If the groups of all the user IDs at higher ranks and the process names of the output process are not included in the distribution history data, the data management system determines that it is invalid data and forbids the execution of the output process.

Figure 14:
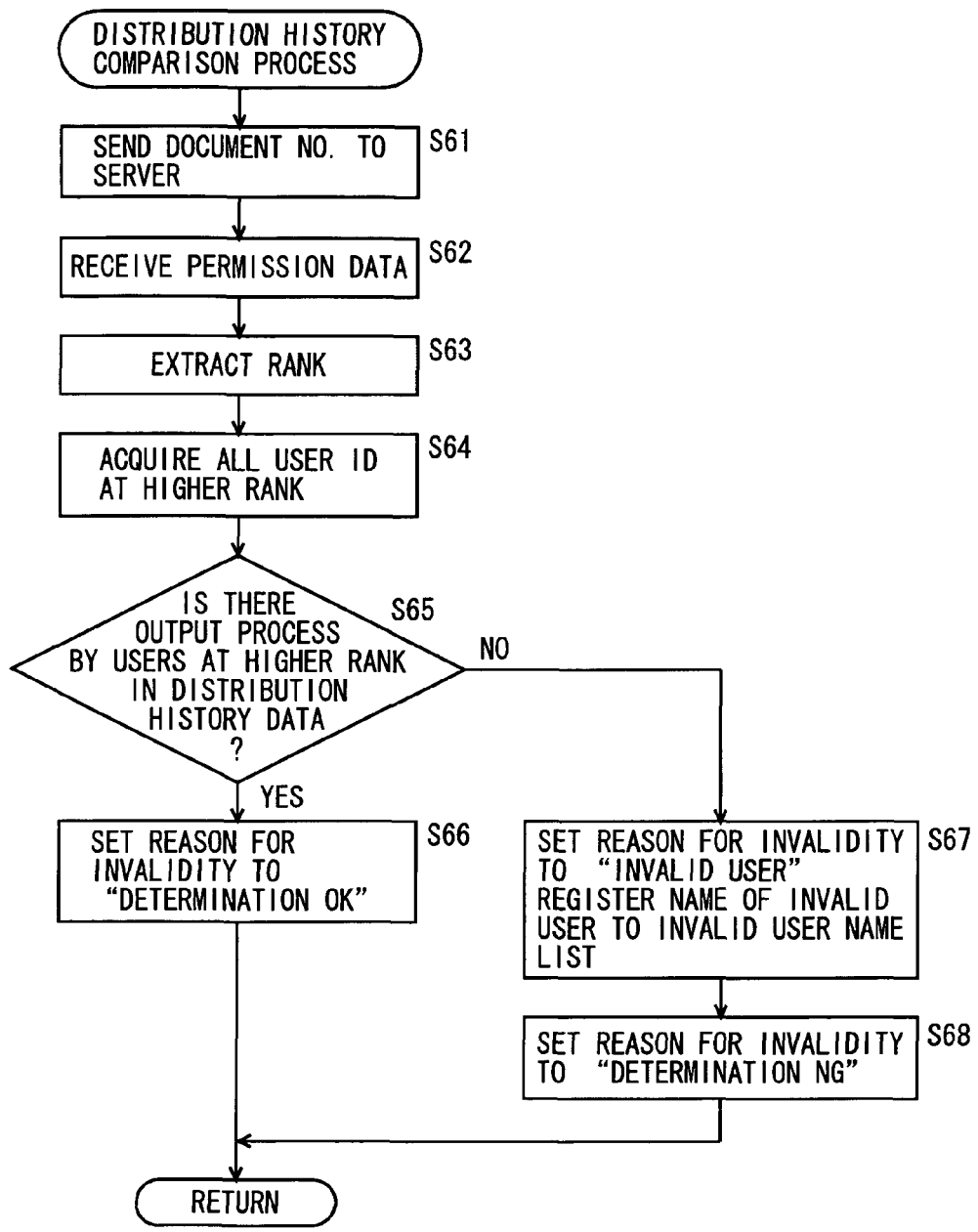
FIG. 14 is a flow chart illustrating the flow of the distribution history comparison process which is executed at a step S11 of FIG. 10, in the MFP according to the second embodiment.

FIG. 14 is a flow chart illustrating the flow of the distribution history comparison process which is executed in step S11 of FIG. 10. Referring to FIG. 14, the document No. is sent to server 2 (step S61). The server 2 which received the document No. sends the permission data (see FIG. 13) which has been prestored for the document No. to MFP 1A.

In step S62, the permission data corresponding to the document No. sent in step S61 is received from server 2.

In step S63, from the received permission data and the user ID, the rank of the user is extracted. For example, when the permission data illustrated in FIG. 13 is received and the user ID is "X011", the third rank is extracted.

Then, in step S64, the user IDs of all the users at the higher ranks are acquired. For the user ID "X011", the user ID "X001" of the first rank and the user ID "X010" at the second rank are acquired.

Then, it is determined whether or not the history of the output processes by all the users at the higher ranks are included in the distribution history data (step S65). Namely, it is determined whether or not the groups of the user IDs acquired in step S64 and the names of the output processes are included in the distribution history data. If the groups of all the user IDs acquired in step S64 and the names of the output processes are included in the distribution history data, the process proceeds to step S66. If any one of them is not included, the process proceeds to step S67.

In step S66, the result of the invalidity determination is set to "determination OK" and the process ends. In step S67, the reason for invalidity is set to "invalid user" and the user ID is sent to server 2. Server 2 prestores an invalid user list and resisters the received user ID of the invalid user to the invalid user list. Then, in step S68, the result of invalidity determination is set to "determination NG" and the process ends.

With the data management system according to the second embodiment, the order of users permitted to execute processes can be defined by permission data. Therefore, the order of users who receive data can be defined. Thus, processes which can not follow the order are not executed and therefore invalid distribution of documents can be prevented.

Third Embodiment

While there has been described an example where the distribution history data is embedded in documents as watermarking information in the data management system according to the first embodiment described above, the distribution history data is stored only in server 2 in the data management system according to the third embodiment. In this case, in the distribution history comparison process which is executed in step S11 of FIG. 9, the input processes and the output processes which are set are compared with the permission data. In the case where the management style is the distribution history management, it is determined whether or not the groups of user IDs and the names of the input processes which are set and the groups of user IDs and the names of the output processes which are set are included in the distribution management permission data. In the case where the management style is the work flow management, it is determined whether or not the groups of user IDs and the names of the input processes which are set and the groups of user IDs and the names of the output processes which are set are included in the groups of the user IDs of the persons who are the distribution destinations and the names of processes permitted for them.

According to the data management system of the third embodiment, it can be determined whether or not the input process executed for inputting documents to MFP 1A and the output process which is intended to be executed are invalid. In the case where they are determined to be invalid, the output process is forbidden and therefore the documents will not be distributed any more.

Forth Embodiment

In the data management system according to the first embodiment, one of the distribution management permission data and the work flow management permission data is sent from server 2 to MFP 1A and MFP 1A determines whether or not processes are invalid. In the data management system according to the forth embodiment, the determination process for determining whether or not processes are invalid, which is executed in MFP 1A in the first embodiment, is executed in server 2. Therefore, in the data management system according to the forth embodiment, the distribution history comparison process in step S11 of FIG. 9 is executed in server 2 and MFP 1A receives the result of determination of the distribution history comparison process executed in server 2. Only the result of determination is sent from server 2 to MFP 1A. This may reduce the process load of MFP 1A.

Fifth Embodiment

In the data management system according to the second embodiment, the permission data is sent from server 2 to MFP 1A and MFP 1A determines whether or not processes are invalid. In the data management system according to the fifth embodiment, the determination process for determining whether or not processes are invalid, which is executed in MFP 1A in the second embodiment, is executed in server 2. Therefore, in the data management system according to the fifth embodiment, the distribution history comparison process of FIG. 14 is executed in server 2 and MFP 1A receives the result of determination of the distribution history comparison process executed in server 2. Only the result of determination is sent from server 2 to MFP 1A. This may reduce the process load of MFP 1A.

Sixth Embodiment

In the data management system according to the sixth embodiment, the document management data, the distribution management permission data, the work flow management permission data and the distribution history data, which are stored in server in the data management system according to the first embodiment, are stored in MFP 1A. In the data management system according to the sixth embodiment, server 2 is not required and only MFP 1A is required for preventing invalid processes for documents.

Seventh Embodiment

In the data management system according to the seventh embodiment, the permission data, which is stored in server in the data management system according to the second embodiment, is stored in MFP 1A. In the data management system according to the seventh embodiment, server 2 is not required and only MFP 1A is required for preventing invalid processes for documents.

Eighth Embodiment

In the data management system according to the eighth embodiment, the distribution management permission data or the work flow management permission data, which is stored in server 2 in the first embodiment, is included in the additional information which is embedded in documents as watermarking information. The additional information includes the document No. and one of the distribution management permission data and the work flow management permission data. The additional information may further include the distribution history data.

In the data management system according to the eighth embodiment, server 2 is not required and it can be determined, from the additional information extracted from documents, whether or not processes for the document are invalid processes.

Ninth Embodiment

In the data management system according to the ninth embodiment, the permission data, which is stored in server 2 in the second embodiment, is included in the additional information which is embedded in documents as watermarking information. The additional information includes the document No., the permission data and the distribution history data.

In the data management system according to the ninth embodiment, server 2 is not required and it can be determined, from the additional information extracted from documents, whether or not processes for the document are invalid processes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data managing method comprising the steps of:
    inputting data files by input processes, each of the data files being identified by respective data identification information;
    individually for each of the data files, defining permission data that associates user identification information with each of a plurality of different types of processes that can be performed on that data file, to indicate whether each such type of process is permitted for the data file;
    analyzing distribution data which associates, for each of the data files, each of processes which have been executed on the data file with user identification information identifying users who have executed the processes;
    determining whether or not each of processes which have been executed on one of the data files for an identified user, indicated in the distribution data, is permitted by the identified user by referring to the permission data;
    upon receiving a request to execute a process on the data file, updating the distribution data for the data file before obtaining a result of the determination step that all of processes that have been executed on said one data file are permitted; and
    forbidding execution of output processes for said one data file based on a result of said determination step that at least one of said processes that have been executed on said one data file is not permitted for the user who executed the process.

2. The data managing method according to claim 1, wherein
    said forbidding step includes a step of sending said data identification information of said one data file and a fact that execution of an input process which is not permitted for said one data file was requested, to a predetermined destination.

3. The data managing method according to claim 1, wherein
    said output processes include at least one of a process for storing data in recording media, a process for sending data through E-mails, a process for sending data through file transfer and a process for generating an image of said data.

4. The data managing method according to claim 1, wherein
    said forbidding step includes a step of sending said data identification information of said one data file and a fact that execution of an output process which is not permitted for said one data file was requested, to a predetermined destination.

5. The data managing method according to claim 1, further comprising:
    adding the distribution data to the data files by embedding a respective part of the distribution data in each of the input data files as watermarking information.

6. The data managing method according to claim 1, wherein
    a part of said permission data that is related to each of the plurality of data files is included in the respective input data file.

7. The data managing method according to claim 1, wherein
    said forbidding step includes a step of adding a password to the one data file and storing the one data file in a predetermined region with the password in a secret mode.

8. The data managing method according to claim 1, wherein
    said input processes include at least one of a process for receiving data through E-mails, a process for receiving data through file transfer, a process for optically reading an image generated on recording media and a process for reading data from recording media.

9. The data managing method according to claim 1, further comprising:
    extracting watermarking information embedded in the one of the plurality of data files.

10. A data managing device comprising:
    a data inputting portion for inputting data files; each of the data files being identified by respective data identification information;
    a permission data storage unit for storing said permission data which associates, individually for each of the data files identified by the respective data identification information, user identification information with process identification information for each of a plurality of different types of processes that can be performed on the data file identified by respective data identification information, to indicate whether each such type of process is permitted for the identified data;

an identification information extracting portion for extracting, from said input data files, each data identification information for respectively identifying each of the data files;

a user identification information input portion for receiving the input of user identification information for identifying a user;

a distribution data storage and update portion for storing and updating received distribution data which associates, for each of the data files, each of processes which have been executed on the data file with user identification information identifying users who have executed and who have requested to execute the processes;

a determination portion for determining whether or not each of processes which have been executed for one of the input data files by the user identified by the received user identification information is permitted for the identified user, by referring to the permission data; and a forbidding portion for forbidding execution of output processes by the identified user for said one of the input data files if said determination portion has determined that at least one of said processes that have been executed and that have been requested to be executed on said one of the input data files by the identified user is not permitted for the identified user wherein, upon receiving a request to execute a process on the input data file, the distribution data storage and update portion updates the distribution data for the input data file before a result that all of processes that have been executed on said one of the input data file are permitted is obtained.

11. The data managing device according to claim 10, wherein a part of said permission data that is related to each of the plurality of files is included in the respective input data file.

12. A data managing device capable of communicating with a server through a communication line, said server including a permission data storage unit for storing permission data which associates, for each data identification information, user identification information with process identification information for each of a plurality of different types of processes that can be performed on the data identified by the data identification information, to indicate whether each such type of process is permitted for the identified data, and a distribution data storage and updating unit:

a data input portion for inputting data files, each of the data files being respectively identified by each data identification information;

a transmitting portion for sending said acquired data identification information to said server;

a receiving portion for receiving permission contents corresponding to said data identification information in response to the transmission of said data identification information performed by said transmitting portion, said permission contents associating, for a data file identified by the data identification information, user identification information with process identification information for each of a plurality of different processes that can be performed on the data file, to indicate whether each such process is permitted for the data file;

a receiving and updating portion for receiving and updating distribution data contents corresponding to said data identification information in response to the transmission of said data identification information performed by said transmitting portion, the distribution data contents associating, for the data file identified by the data identification information, each of processes which have been executed on the identified data file with user identification information identifying users who have executed and who have requested to execute the processes;

a user identification acquiring portion for obtaining a user identification of a user;

a determination portion for determining whether or not each of processes which have been executed on the identified data file by the user identified by the obtained user identification, indicated in the received distribution data contents, is permitted for the identified user, by referring to said received permission contents; and a forbidding portion for forbidding the execution of output processes for said identified data file by the identified user if said determination portion has determined that at least one of said processes that have been executed and that have been requested to be executed on the data file by the identified user is not permitted for the identified user wherein, upon receiving a request to execute a process on the identified data file, the receiving and updating portion updates the distribution data for the identified data file before a result that all of processes that have been executed on the identified data file are permitted is obtained.

* * * * *